(12) United States Patent
Daniels et al.

(10) Patent No.: US 8,931,155 B2
(45) Date of Patent: Jan. 13, 2015

(54) BELT FASTENING SYSTEM

(75) Inventors: William James Daniels, Orland Park, IL (US); Patrick John Dubiel, Belmont, OH (US); David Alan Ullom, Wheeling, WV (US); William R. Wawczak, Glen Ellyn, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 1660 days.

(21) Appl. No.: 12/520,388

(22) PCT Filed: Jun. 1, 2007

(86) PCT No.: PCT/US2007/012986
§ 371 (c)(1),
(2), (4) Date: Aug. 27, 2010

(87) PCT Pub. No.: WO2007/143120
PCT Pub. Date: Dec. 13, 2007

(65) Prior Publication Data
US 2010/0319175 A1    Dec. 23, 2010

Related U.S. Application Data

(60) Provisional application No. 60/810,297, filed on Jun. 2, 2006.

(51) Int. Cl.
*B25B 27/14* (2006.01)
*F16G 3/04* (2006.01)
*F16G 3/16* (2006.01)

(52) U.S. Cl.
CPC ... *F16G 3/04* (2013.01); *F16G 3/16* (2013.01)
USPC ..................................... 29/281.1; 29/243.51

(58) Field of Classification Search
USPC ..................... 29/525.01, 243.51, 407.1, 281.1
See application file for complete search history.

(56) References Cited

U.S. PATENT DOCUMENTS 1,385,685 A * 7/1921 Jacobs et al. .............. 29/243.51
1,409,742 A * 3/1922 Ling ............................. 29/566
(Continued)

FOREIGN PATENT DOCUMENTS

DE       195 13 483 A1   10/1996
EP       0 546 299 A1    6/1993

OTHER PUBLICATIONS

Extended European Search Report issued in counterpart European Application No. 07 79 5629.0 dated Jun. 1, 2011 (4 pages).

*Primary Examiner* — Joseph J. Hail
*Assistant Examiner* — Henry Hong
(74) *Attorney, Agent, or Firm* — Fitch, Even, Tabin & Flannery LLP

(57) ABSTRACT

A belt fastener installation tool is provided with a raised belt guiding surface for inserting the belt between upper and lower plates of a belt fastener held in the tool. The raised surface keeps interference with the lower plate during belt insertion between the fastener plates to a minimum. The raised surface can be formed on a separate riser plate member for being secured to an existing belt fastener installation tool; the raised surface can be formed as an integral, one-piece member in combination with the anvil plate of the tool; and the raised surface can be formed integrally with an extruded base of the tool. Gripping structure is also optionally included on the raised surface, such as on the portion thereof under the clamp bar to provide enhanced gripping of the clamped conveyor belt.

9 Claims, 15 Drawing Sheets

(56) References Cited

U.S. PATENT DOCUMENTS

| | | | |
|---|---|---|---|
| 4,111,080 A * | 9/1978 | Pray | 29/243.51 |
| 4,144,628 A * | 3/1979 | Schick | 29/243.51 |
| 4,440,336 A * | 4/1984 | Kifor | 227/4 |
| 4,688,711 A * | 8/1987 | Gladding et al. | 227/147 |
| 5,170,924 A * | 12/1992 | Musil | 227/111 |
| 5,368,214 A * | 11/1994 | Schick | 227/147 |
| 5,524,808 A * | 6/1996 | Vogrig | 227/147 |
| 5,644,836 A * | 7/1997 | Schick | 29/798 |
| 5,680,688 A * | 10/1997 | Garner | 29/243.51 |
| 5,848,463 A * | 12/1998 | Herold | 29/798 |
| 5,906,038 A * | 5/1999 | Herold | 29/432.1 |
| 6,081,995 A * | 7/2000 | Herold | 29/798 |
| 6,216,851 B1 * | 4/2001 | Mitas et al. | 198/844.2 |
| 6,311,393 B1 * | 11/2001 | Garner | 29/798 |
| 8,151,432 B2 * | 4/2012 | Daniels et al. | 29/525.01 |
| 2006/0096838 A1 * | 5/2006 | Buchko | 198/689.1 |
| 2007/0271754 A1 * | 11/2007 | Kolodziej | 29/243.51 |

* cited by examiner

BELT FASTENING SYSTEM

CROSS-REFERENCE TO RELATED APPLICATIONS

This application is a U.S. national phase application filed under 35 U.S.C. §371 of International Application PCT/US2007/012986, filed on Jun. 1, 2007, designating the United States, which claims priority to U.S. Provisional Application 60/810,297, filed on Jun. 2, 2006, which are hereby incorporated herein by reference in their entirety.

FIELD OF THE INVENTION

This invention relates to a system for securing belt fasteners to a belt by fasteners such as rivets or the like for a belt splice used to join opposite ends of a conveyor belt to one another.

BACKGROUND OF THE INVENTION

The belt fastener apparatus disclosed herein will be described in conjunction with a hinged belt fastener such as shown in U.S. Pat. Nos. 3,742,557; 3,176,358 and 6,053,308. Features of the present invention may also be used with the typical plate kind of belt fasteners as shown in U.S. Pat. No. 3,141,346. The present invention is not limited to these particular belt fasteners identified herein as other belt fasteners may be used which have upper and lower plate portions secured to the top and bottom surfaces of a belt by fasteners.

In the hinged belt fastener, an upper and lower plate are joined by central U-shaped hinge or loop portions. These adjacent hinge portions are pivotally connected by a hinge pin to complete the belt splice between rows of individual hinge belt fasteners along each of the opposite belt ends.

Preferably, these upper and lower plates are secured tightly to and generally flush against the respective top and bottom sides of the conveyor belt by rivet fasteners. Typically, the rivets have an upper, preformed head which seats in a recess or depression in the top of a plate or fastener and the opposite end of the rivet is upset or flared to form a lower rivet head which then is seated in a recess or depression in the lower plate of the belt fastener.

In a widely use conventional belt fastener system now in the prior art, the U-shaped hinge portions of a row or strip of hinged belt fasteners are held in alignment along the belt end by a gauge pin on the belt fastening apparatus. More specifically, the gauge pin is located through openings in a series of upstanding guide members fixed to the anvil base and through the loop portions of the belt fasteners aligned and located on the tool. In this conventional tool, there are lower anvil plates with rivet head forming bushings raised above the surface of the lower anvil plate to upset the lower hollow ends of the rivets into the shape of rivet heads. Usually, the rivets are attached to the lower end thereof to a pointed pilot nail which is driven through the belt carcass, and then the pilot goes into the hollow rivet forming bushings for cooperation with the rivet head forming bushings to upset the thin, hollow cylindrical wall on the lower end of the rivet into the lower rivet head.

In some applications, the operator will individually align and drive the rivets one by one into the belt fasteners. Usually, a faster operation is obtained by using a guide block having a plurality of rivet receiving, through bores each of which is loaded with a rivet; and a common driver having a drive pin for each of the loaded rivets is driven to drive simultaneously the drive pins through the bores in the quick block and to drive the rivets through the upper and lower plate apertures and to form the lower rivet heads.

Prior to driving the strip of belt fasteners in the tool, the belt end was is inserted into the gap between the upper and lower plates until the belt end hit belt stops integrally formed on the belt fasteners. Then, the belt is clamped in this inserted position by turning a pair of L-shaped handles which have screw threads in the clamping bar and in the lower plate of the tool so that the clamping bar is pushed down toward the anvil plates located at the lower side of the belt end.

After belt insertion and clamping and loading of the rivets in the guide block, the common driver having the plurality of drive rods is hit with a large hammer or mallet to simultaneously drive the loaded pilot nails and rivets through the belt carcass and to bend down the upper plate of the belt fastener from an upwardly, inclined position to a horizontal position flat against the top side of the belt. The rivets are driven through the belt carcass to cause the hollow ends of the rivets to be upset by the raised bushings to form the lower heads on the rivets.

In some instances the belt clamp may not be effective in holding the belt securely fixed in the clamped position within the belt fasteners between the upper and lower plates thereof. Instead of using a belt clamp bar or the like, as described in U.S. Pat. No. 6,053,308, the belt fastener's upper or lower plates may be provided with integral projecting teeth which can be driven into the belt to secure the belt end and to hold it in position as the rivets are being driven through the belt and upset to form the lower rivet heads. Although the above described conventional tool operates quite successfully and has been employed in large numbers for a number of years, it has been found that the clamping bar is not as effective as desirable. In some instances, some operators dispense with the use of the clamping bar and merely tack or nail the belt to an underlying board to prevent outward movement of the belt end from its original location inserted fully between the upper and lower fastener plates during the hammering and the pounding of a succession of the belt fasteners in the strip. If the belt end withdraws or otherwise shifts from its fully inserted position, the rivet may be driven through the belt carcass at a location very close to the belt edge leaving insufficient belt material to resist tearing of this thin belt end portion.

Also, in this conventional belt fastening tool, the belt clamping bar is tightened against the belt by rotating a pair of screw handles that are screwed into the lower plate of the belt fastening tool; and sometimes the screw holes for the handles in the tool become filled with coal dust in a dirty coal mining operation and as such, is a source of maintenance problems and a hindrance to tool operation. Moreover, the clamping force obtained using the manual screw handles could be greater in order to achieve a better clamping of the belt to the tool. In addition to low clamping force from the screw handles, the above-described clamping bar may deflect or bend vertically or horizontally, thereby lessening the force being applied to clamp the belt. Therefore, a need exists for an improved clamp bar construction. Finally, very long belt ends, e.g., several feet to five feet may be difficult to insert in the gap between the upper and lower plates prior to being clamped.

SUMMARY OF THE INVENTION

In the illustrated embodiment, the belt end being inserted is raised on the tool by a belt guide surface positioned above the front edge of the lower fastener plate; and hence it is easier to slide the belt end past this front edge and into the gap space between the upper and lower plates than in the conventional tool. In the preferred embodiment, this belt raised surface may also be formed with an improved gripping surface having an uneven surface such as formed by serrations or grooves forming lowered points or areas into which the bottom surface of the belt is pushed by the overhead clamp and projecting ribs or points which are pushed into the bottom surface of the belt. This improved gripping surface preferably comprises parallel serrations running the length of the belt gripping surface and parallel to the belt clamping bar. The gripping surface may be constructed or formed in various manners such as a roughened surface, non-parallel grooves or an additional textured material surface applied to this support clamp portion of the frame.

In one form, the raised surface has the gripping surface features thereof on only the portion of the surface that is aligned under the clamp with the remainder of the surface being smooth so that hang-ups during sliding of the belt thereon into position between the fastener plates is kept to a minimum.

The raised surface may be formed on a riser plate that is separate from the current anvil plates and base of the existing belt fastener installation tool. In this manner, the riser plate can be offered as an add-on for being fastened to the anvil plates of existing tools.

Another alternative is to form the anvil plate and riser plate as a unitary, one-piece, plate member. In this alternative, the riser plate portion can have a smooth upper surface with the base having a raised surface substantially level therewith and adjacent thereto with the base raised surface being provided with gripping features or structure such as ridges or serrations. In this instance, the base is preferably an extrusion for forming the integral gripping surface features thereof.

Alternatively, the extruded base can include the entire raised surface integrally formed therewith. In this form, the base raised surface includes gripping structure under the clamp and the remainder of the surface extending toward the fasteners is smooth to minimize belt hang-ups as the belt is inserted between the fastener plates. The anvil plates are separate components from the raised surface that is integrally formed with the base in this form.

Additionally, the gripping or clamping of the belt to resist movement of the belt during a fastener application operation may be enhanced or provided by a more strong or rigid construction for the clamp bar. The preferred overhead clamp bar is a solid bar of metal in contrast to the hollow, thin wall metal tube used heretofore. The solid bar illustrated herein has an inverted T-shape with an upstanding central portion and a lower horizontally extending lower portion to provide increased cross-sectional thickness to resist bending or deflecting in both the vertical and horizontal directions.

In accordance with another aspect, the illustrated belt fastener applying apparatus is provided with improved locking handles or devices for applying greater locking or clamping force to each of the opposite ends of the overhead clamp bar than heretofore provided by threaded locking handles heretofore used in the prior art and as disclosed in U.S. Pat. No. 4,344,213. Preferably, this is achieved by use of over-center toggle locking handles cooperating with opposite ends of the clamping bar and the stationary frame of the belt fastener tool. The over-center toggle locking mechanism may be operated quickly with a simple arcuate swinging motion in contrast to the slow rotations of screw handles heretofore used to screw the clamping bar tightly against the belt.

DETAILED DESCRIPTION OF THE PREFERRED EMBODIMENT

Figure 1:
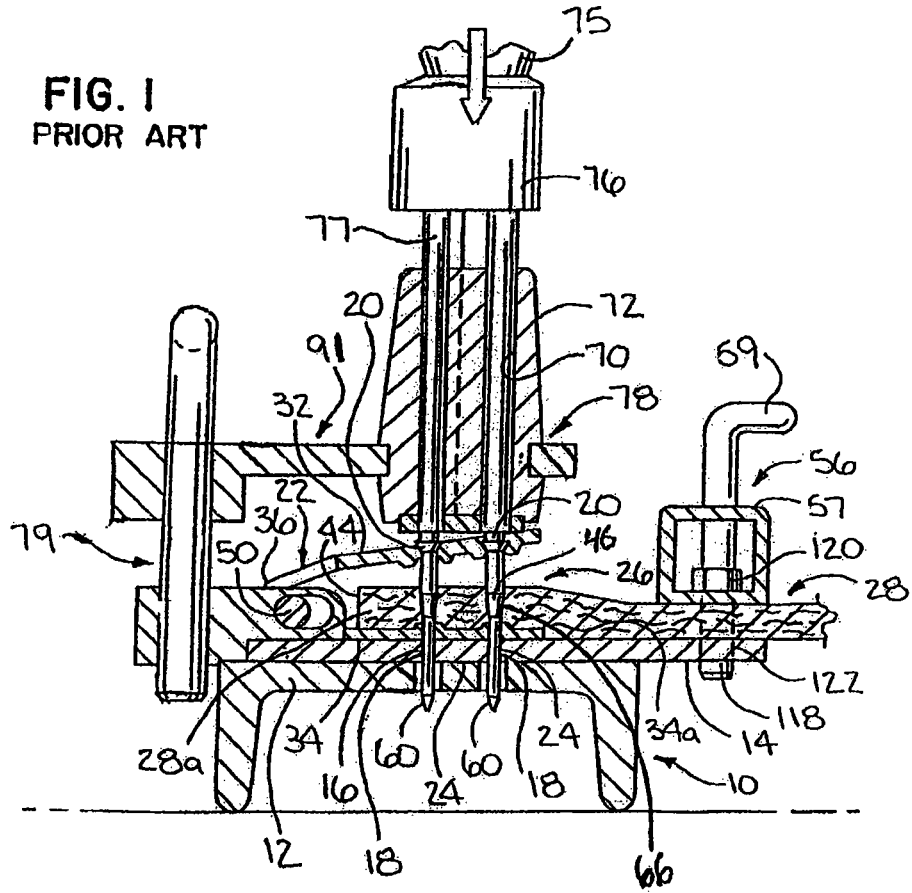
FIG. 1 is an elevational, sectional view of a conventional, prior art belt fastener applying system.

Prior to describing the preferred embodiment illustrated in FIGS. 2-5, a general understanding of the conventional, prior art tool illustrated in FIG. 1 and as shown and described in the Appendix (attached hereto) will be first provided. The tool of FIG. 1 generally includes a base 10 made from a length of steel channel and having a generally horizontal web portion 12 which supports a plurality of anvil plates 14. The width of the belt 28 determines the minimum length of the base 10. Belts typically have widths of, for example, 24, 42, or 60 inches.

Apertures 16 and 18 are formed in the anvil plate 14 at locations which correspond to countersunk holes or perforations 20 and 21 in the belt fasteners 22, and also are formed in the underlying horizontal portion 12 of the base respectively. Each of the apertures 16 in the anvil plates is substantially centered in a button or rivet head forming bushing 24 which comprises a generally circular, upwardly extending rim. As described in greater detail below, each of the apertures and bushings 24 cooperates with one of the rivet assemblies 26 as the rivet assemblies are driven downward to form the lower rivet heads.

Each of the hinge-type fasteners 22 includes an upper plate 32 and a lower plate 34 which are joined by a generally U-shaped center hinge loop portion 36 adapted to interfit with an opposite U-shaped portion of belt fasteners on an adjacent belt end (not shown) to form a hinge structure to receive a hinge pin (not shown). The countersunk holes or apertures 20, 21 for receiving rivets are formed in a predetermined pattern through each fastener plate 32, 34, the upper fastener plates 32 being countersunk on their top surfaces and the lower fastener plates being countersunk on their bottom surfaces. The preferred fastener plates each have five recessed apertures arranged in a W-shaped pattern. The fastener-receiving apertures or perforations are located about one-half inch from an adjacent perforation. The preferred fastener plates have an inboard, contoured edge 34a (FIG. 1A) preferably in the form of a scalloped edge for the reasons described in U.S. Pat. No. 6,053,308.

Prior to installation, the upper plates 32 are upwardly inclined relative to the lower plates 34 via the U-shaped portions 36 to facilitate insertion of the belt end 44 between the upper and lower plates. Installation of the rivets 46 (FIG. 1) pushes the upper plates 32 downward, flexing the U-shaped portions 36 so that the belt end 44 is squeezed between the upper and lower plates.

The fasteners 22 are maintained in a predetermined position by engagement of the countersunk portions of the apertures 21 of the lower fastener plates 34 with the upwardly projecting bushings 24 on the anvil plates 14, which assist in forming the lower rivet head. The strip of fasteners are locked into place at their inboard side by a gauge pin 50 which extends through the U-shaped portions 36 of the belt fasteners 22.

Pressure is applied to clamp the belt 28 in position by a clamp 56 which herein comprises a generally horizontal clamping member 57 with screw handles 59 at each end for applying downward pressure to the clamping member. The illustrated clamping member 57 is a bar in the form of a length of square tubing, e.g., having a thin wall of about 0.125 inch thick. Particularly, for large belts of the five foot width, this tube clamping member becomes deflected or bent at the middle portion of the belt in either or both of the vertical and horizontal directions thereby reducing its effective clamping force. Each screw handle 59 comprises a generally L-shaped rod having a threaded portion 118 at its lower end and a nut 120 fixed to it above the threaded portion and inside the hollow tube. The threaded portions 118 of the screw handles are received in threaded bores 122 in the anvil plates 14 at the corners of the base. Clockwise rotation of the screw handles 59 through the nuts 120 and further into the threaded bores forces the clamping member downward to clamp the belt in place against the web portion 12 of the channel base 10. In some applications, such as in a coal mine, the threaded bores become filled or partially filled with coal dust or other debris and necessitate a cleaning to remove the coal dust accumulated therein.

To rivet a row of fasteners 22 to the belt 28, the belt end 44 is inserted between the upper and lower fastener plates 32 and 34, and rivet assemblies 26 are driven downwardly through the perforations 20 in the upper fastener plate, through the thickness of the belt end 44, and through the perforations 21 in the lower fastener plate.

Referring to FIG. 1, each of the illustrated rivet assemblies 26 includes a rivet 46 having a head at its upper end and a hollow lower end for receiving the upper end of an interfitting detachable pilot nail 60. The pilot nail has a sharpened point at its lower end for piercing the belt material and guiding the rivet assembly through the perforations 20, 21 in the fasteners and apertures in the anvil plates 14. The pilot nail has an integral upwardly extending pin portion at its upper end which fits within the hollow lower end of the rivet 46, and an integral annular shoulder 66 formed just below the pin.

As a rivet assembly 26 is driven downwardly, the shoulder 66 seats in the bushings 24, arresting the downward progress of the nail 60. As the lower end of the rivet 46 passes through the perforation 21 in the lower fastener plate 34, the upper surface of the button 24 flares the hollow lower end of the rivet 46 outwardly as described in U.S. Pat. No. 4,258,461. As described in greater detail below, the rivet assemblies 26 are aligned and guided as they are driven by a plurality of substantially vertical bores 70 in a guide block assembly 78.

An impact distributing driver, which is either manual or power driven, is employed to transmit impact force such as from a single hammer 75 simultaneously to a plurality of rivet assemblies disposed within the bores 70 of the guide means 78. The guide block 72, preferably made of an elastomer, is part of the guide means or block assembly 78 supported in a rigid frame 91 and preferably includes alignment surfaces 79 for maintaining the guide block in one of a plurality of predetermined positions with respect to the base 10. The preferred driver 74 includes an impact upper end or cap 76 for receiving hammer blows and a plurality of downwardly extending drive pins or rods 77 which are fixed at their upper ends to the cap and adapted to be received within the bores 70 of the guide block 72. The drive rods are preferably arranged in a group corresponding to a group of perforations 20, 21 in a single fastener plate 32, 34 so that all of the rivet assemblies 26 for a particular fastener 22 may be driven simultaneously.

Referring now to the illustrated embodiment which is shown in FIGS. 2-5, the belt end is inserted into the gap between the upper and lower plates 32 and 34 and is positioned on a raised belt surface 80 (FIG. 5) which raises the belt up to at least the level of the top side of the lower fastener plate 34, preferably to a height above the upper front edge 34a (FIG. 1) of the lower plate 34 so that when the belt is pushed into the gap, the lower corner 28a of the belt end will not abut against this edge 34a on the lower plate and interfere or even stop the sliding insertion, as may occur in the prior art system illustrated in FIG. 1. Herein this raised belt guiding surface 80 (FIG. 5) is formed on a plate 82 which is a horizontally oriented plate fastened to the top side of the web portion 12a of the channel base so as to provide an extra thickness from that shown in FIG. 1 of the prior art. Thus, the raised surface 80 causes the belt end to slide more easily across the lower fastener plate 34 and rivet head forming bushings 24 and into abutment with a belt stop 83 (FIG. 2) thereby limiting any further insertion of the belt into the space between the upper and lower fastener plates.

In the illustrated embodiment in FIGS. 2-5, this belt raised surface 80 is also provided with an improved gripping or mechanical bite surface 82a in the form of an uneven surface having grooves, serrations 84 (FIG. 5) and/or raised points and ribs 85. Herein, grooves 84 between ribs provide some lowered areas into which the lower belt surface may be pushed and the ribs 85 provide some upward projections which are pressed into the lower surface of the belt. In the illustrated embodiment shown in FIGS. 2-5, the gripping surface 82a is part of the raised surface 80 and comprises this series of parallel serrations or grooves and ribs running the length of the belt clamp surface and being parallel to the belt clamping member 157. Preferably, the belt bottom surface is pressed with sufficient pressure to conform to the contour ribbed, gripping surface 82a. A number of different mechanical gripping surfaces 82a may be used, such as a roughened surface, non-parallel grooves, cross grooves, such as a knurled surface, or an attached, separate roughened substrate to provide an improved grip with the clamping bar to hold the belt end against shifting movement, particularly during the hammering of the succession of the belt fasteners and rivets into position along a long length of belt. For example, the belt may be up to five feet in width.

In accordance with another aspect, the belt clamping effectiveness is improved over the prior art such as illustrated in FIG. 1, by providing a stronger and more rigid construction for the clamping member 157 from that of the hollow, metal tube 57 (FIG. 1) having about a ⅛ inch thick metal wall thickness. As previously explained, when the screw handles 59 are tightened or during the rivet attaching of the fasteners to the belt, the center portion of this hollow, thin wall metal tube may bend or be deflected by the belt particularly at the center thereof in either or both of the vertical and horizontal directions. In the illustrated embodiment of FIGS. 2-5, the clamping member 157 is provided with a considerably thicker or larger cross-sectional portion preferably in the form of a contoured, solid bar 90. This illustrated solid bar has a contoured shape in the form of an inverted T with an upstanding central solid portion 90a (FIG. 2) and a lower horizontally extending flange portion 90b. The T-shape bar provides an increased, metal cross-sectional thickness over that of the hollow tubes shown in FIG. 1 to resist bending and flex deflection in both the vertical and the horizontal directions. Herein, both upstanding portion 90a and lower, horizontal flange portion 90b have rectangular cross-sections which could be other shapes than rectangular. The bottom side of the larger width horizontal bar portion 90b engages the top of the belt and pushes the belt down with sufficient clamping pressure to have the mechanical grip with the underlying ribbed surface 82a at the underside of the belt.

The clamping member 157 is guided for vertical movement between an upper position and a lower gripping position by a pair of upstanding end guides in the form of angled shaped bodies 94 (FIGS. 2 and 4), which have a vertical slot 94a in a vertical flange 94b of the body. Vertical side walls 94c at the slot define a pair of spaced, vertical guide walls against which the vertical sides 90c of the lower horizontal, flange portion 90b of the clamping bar may abut and slide. The guide body 94, in this instance, is secured by fasteners to the channel base 10.

In accordance with another important aspect of the embodiment illustrated in FIGS. 2-5, the screw handles 59 had been replaced by improved locking handles or devices which provide a greater locking or clamping force for at the opposite ends of the clamping bar 90 than heretofore provided. As will be described in detail below, an over-center toggle locking device having a U-shaped handle 102 which operates an over-center toggle clamp 100 to push the clamping bar 90 downwardly to cause a mechanical bite of the serrated surface 82a on the raised portion 82 which is located immediately beneath the clamping bar. Also, the over-center toggle clamp is faster in terms of its clamping operation in that the handle 102 is swung only through a small arc to effect the belt clamping, as will be explained in greater detail below, rather than the slow rotations of the screw handles to screw down the prior art clamping device.

Herein, not only is a greater clamping force being applied to opposite ends of the clamping bar 90 than has been provided by the screw handles 59, used in the FIG. 1 system, but also the clamping operation is much faster than a number of slow rotations of each of the screw handles 59 needed to tighten the clamp tubular bar which is used in the FIG. 1 embodiment. This faster operation is achieved by pivoting of over-center clamps 100 having pivot handles 102 through an arc of 180° or less to operate a toggle mechanism that provides a large mechanical advantage and hence results in a larger force being applied to clamping bar 90 when it is engaging and pushing on the upper side of the belt.

As seen in FIGS. 2-5, the over-center toggle clamp 100 illustrated herein comprise a long, vertically extending, toggle rod 106 which has a lower hooked end 106a (FIGS. 2 and 5 in the shape of a J) for hooking engagement under a horizontally extending anchor pin 108 which is secured to the channel base 10. Herein, the anchor pin is a round shaft extending through holes in the depending flanges 11 of the channel base. The toggle rod 106 extends vertically from its lower and hooked end to an upper end 106b (FIGS. 2 and 5) located adjacent, a curved upper end 102a of the U-shaped handle 102. The upper end 106b of the toggle rod is formed with a screw thread and has one or more nuts 110 threaded thereon. The nuts 110 bear down against the top of a coiled compression spring 112 which encircles the upper portion end of the toggle rod 106. The compression spring is a heavy coiled spring which when compressed will provide a biasing, clamping force to the clamping bar 90 when the toggle handle is positioned in its over-center locking position.

The spring 112 is located between the upper nut 110 and a central located roller shaft 114 which is journaled at its opposite ends by pins 114a to the opposite legs 102b of the U-shaped, over-center toggle handle 102. In its unlocked position, the pivoted handle may extend to the left and counterclockwise direction as viewed in FIG. 2. The lower end of the U-shaped handle 102 is pivotally mounted on the ends of the clamping bar 90 for pivoting about a pivot axis through the center of a horizontal pivot pin 116 which spans a pair of spaced blocks or lugs 119, 121 which are fixedly connected to or integral with the opposite ends of the clamping bar 90. The lugs are located on opposite sides of the lower portion of the toggle rod 106 which extends vertically within the slot formed between the lugs. This allows the toggle rod 106 to pivot and to move back and forth across at the axis of rotation of the pivot pin 116 about which the entire U-shaped handle pivots.

Figure 2:
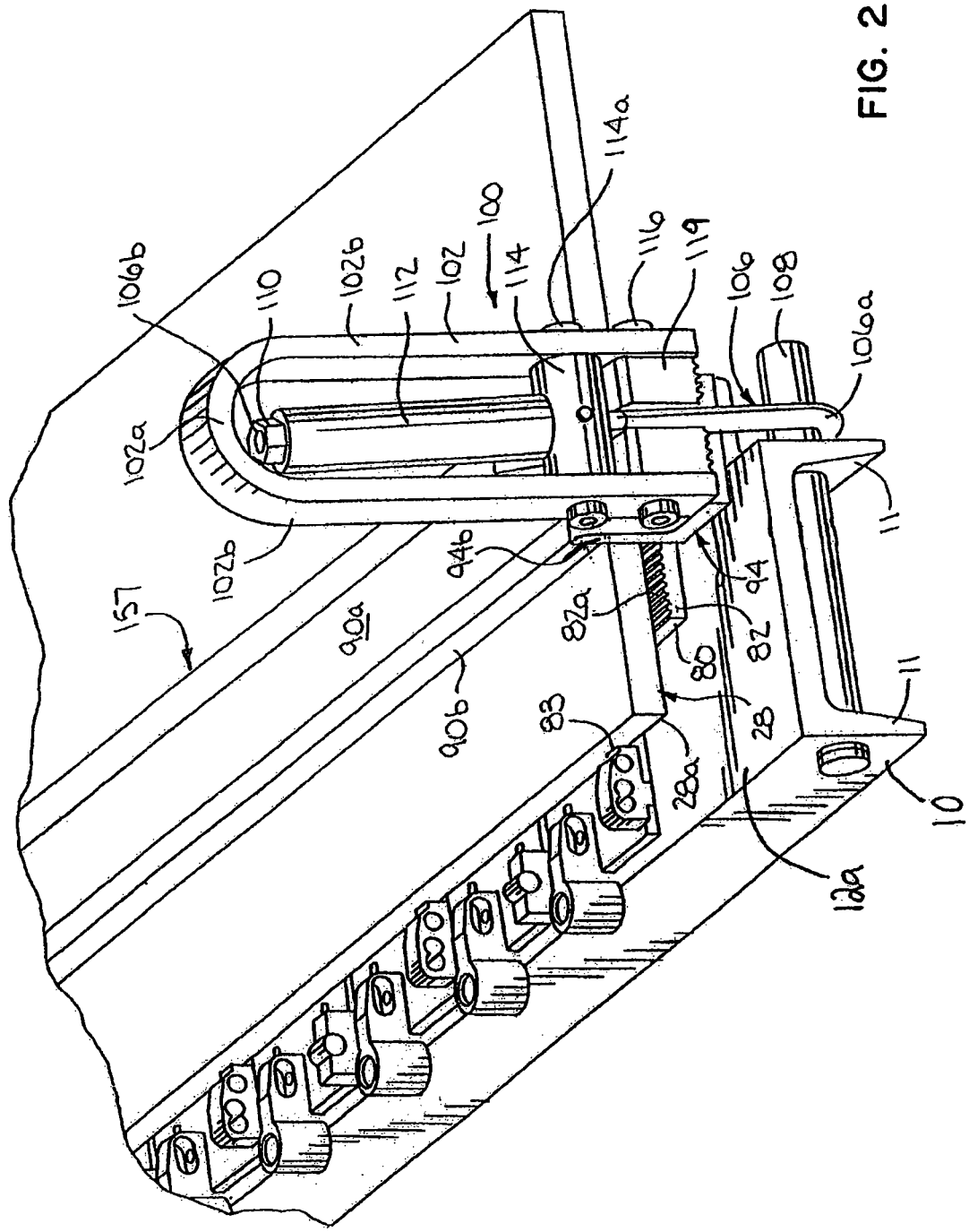
FIG. 2 is an end perspective view of the illustrated embodiment of the belt fastener applying system of the present invention.

In the open and non-clamping position to allow insertion or removal of the belt end, handle 102 and the upper end 106b of the toggle rod 106 will be pivoted outwardly away from the belt and the lower hooked end 106a of the toggle rod will be slightly lowered from engagement with the anchor pin 108. When the handle is pivoted upwardly to turn about the central axis through its pivot pin 116, the lower hooked end 106a will rise slightly and be tightly hooked onto the horizontally extending anchor pin 108 on the channel base 10 and with further upward pivoting of the handle, the nut 110 at the top of toggle rod 106 will compress the compression spring 112 between the nut 110 and roller 114 until the handle 102 reaches the vertical, center position where the handle is straight vertically. In this position, the toggle rod 106 is also positioned in a vertical plane with the spring being compressed the maximum. As the handle 102 is continued to be pivoted through this center position, the spring then slightly expands causing the over-center action where there will be a slight lengthening of the compressed spring. The spring force from the compressed, over-center spring is providing a downward force to the handle to pivot it further downward toward the belt. The compressed spring pushes down on the roller 114, roller shaft 114a, handle legs 102b, pivot pin 116, and lugs 119 and 121 and attached bar 90 and thereby pushes down the clamping bar 90 to clamp the belt end. Stop surfaces may be formed at various locations to stop the rotation of the handle in this over-center locking position, as shown in FIG. 2. To release the clamping pressure, the handle is pivoted outwardly from the belt and across the vertical center position to where the lower J-shaped end of the toggle rod is spaced slightly from the anchor pin 108. The clamping bar 90 and its attached over-center toggle clamps 100 may be detached from the channel base 10 by swinging the handles 102 downwardly until hooked ends 106a of the toggle rod 106 may be pulled and swung clear of their respective anchor pins 108 on the channel base. Then the clamping bar and its loosening toggle clamps may be lifted and separated from the channel base for separate transfer from the location of the finished belt splice.

Although the hinge belt fasteners may have various shapes and configurations, particularly along the inboard edges thereof, a contoured surface in the shape of scalloped configuration (FIG. 1A) may be used. U.S. Pat. No. 6,053,308, discloses a number of advantages for the hinge fastener shown in FIG. 1A, having the contoured edge on the lower plate. For instance, removal of some of the web of metal at the outboard edge between the adjacent countersunk apertures for receiving the rivets allows the belt fastener to provide a lower profile for the fastener and this profiled contoured end sinks deeper into the belt carcass under the force from the rivets so that scrapping devices do not catch the scalloped edges of the fasteners.

Figure 1A:
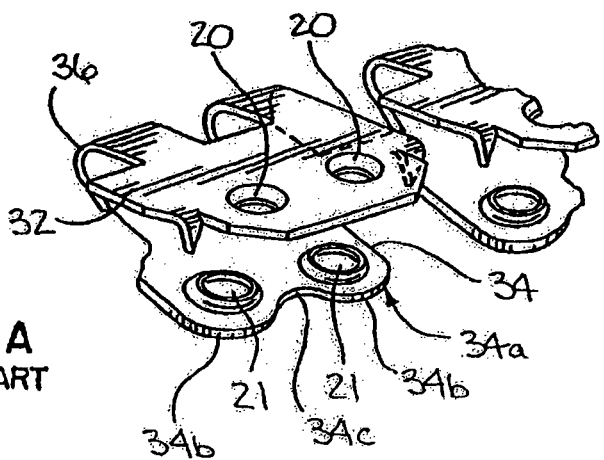
FIG. 1A is a perspective view of a prior art, hinged belt fastener with a contoured, outboard end on the lower plate.

Referring now more specifically to the scalloped, outboard edge 34a of the lower plate 34 in FIG. 1A, it comprises a pair of rounded, projecting portions 34b that are merged by curving into a central, reversely curved depression portion 34c located between the curved projecting portions 34b. The projecting portions have the rivet receiving apertures therein.

Figure 3:
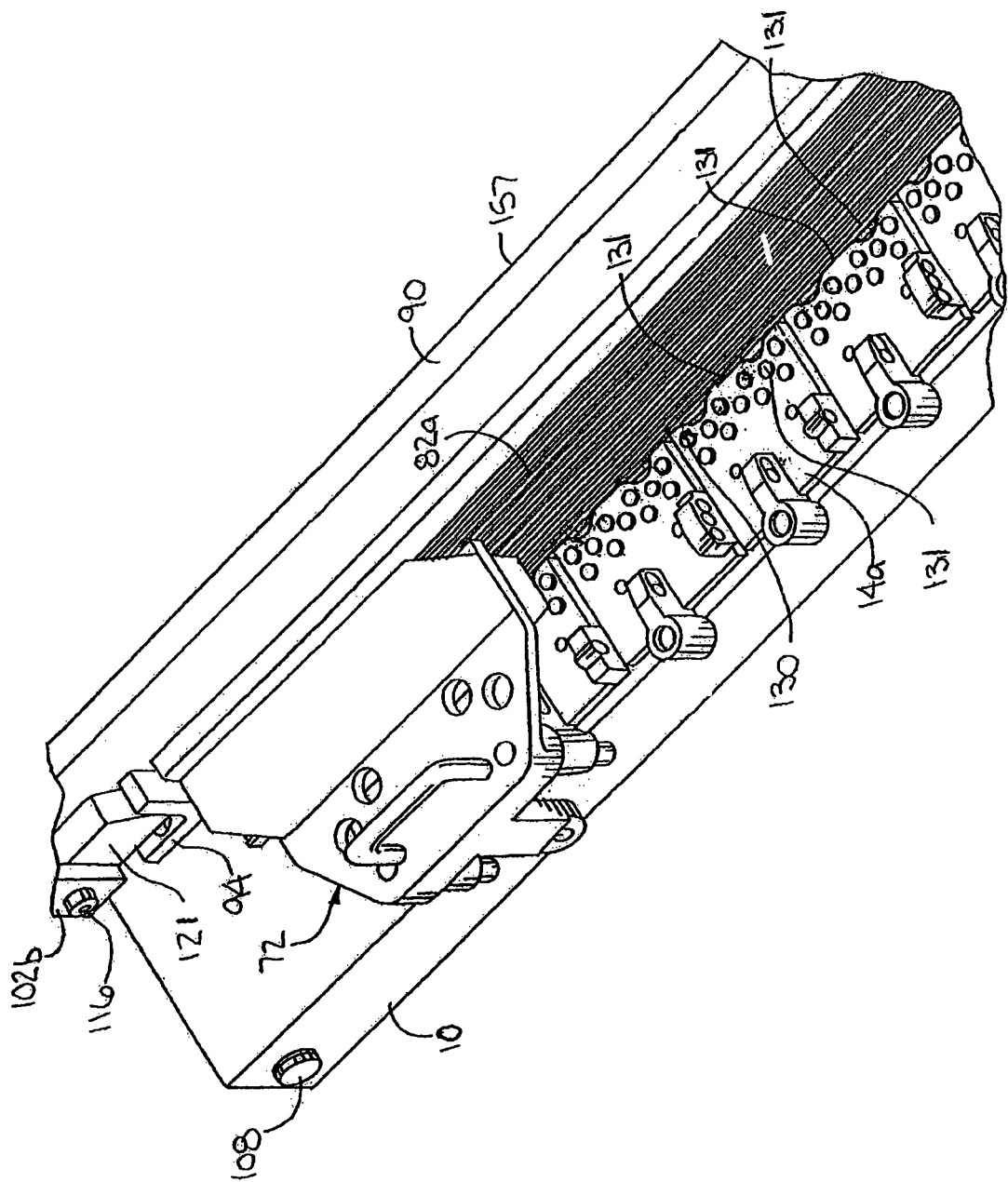
FIG. 3 is a front perspective view of the belt fastener applying system of FIG. 2 having a guide block mounted thereon.
Figure 4:
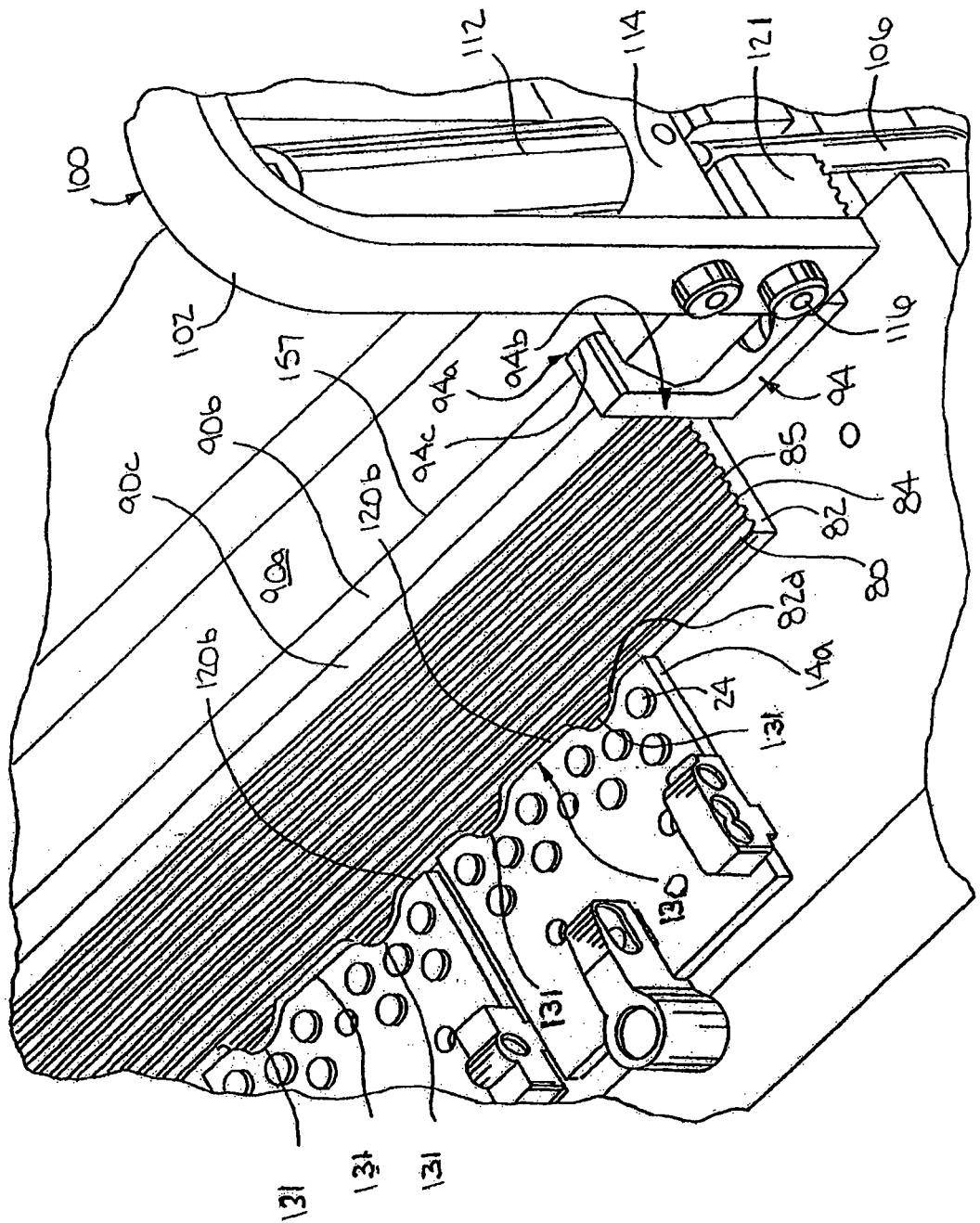
FIG. 4 is a side elevational view of the illustrated embodiment showing a contoured or scalloped surface on the raised guide bar to fit into scalloped, outboard edges on the belt fasteners.
Figure 5:
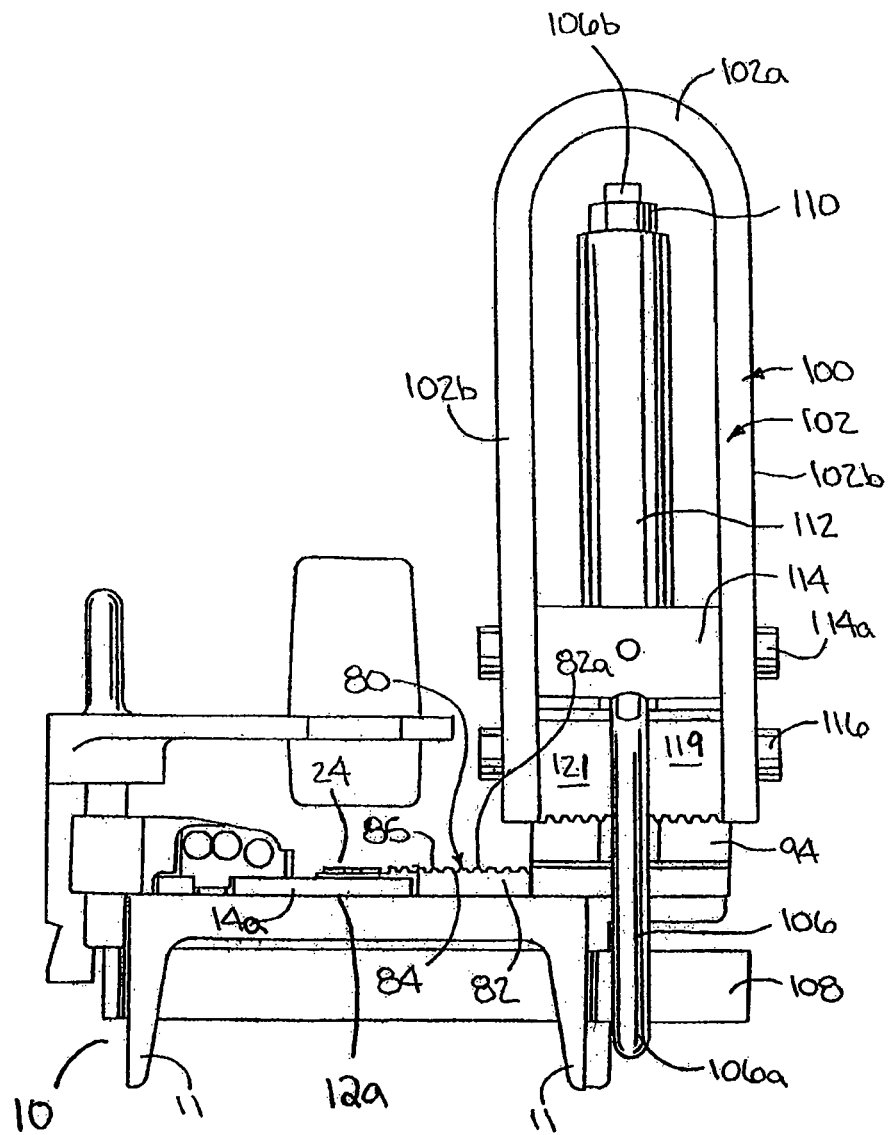
FIG. 5 is a side elevational view of the illustrated embodiment of FIG. 2.
Figure 6:
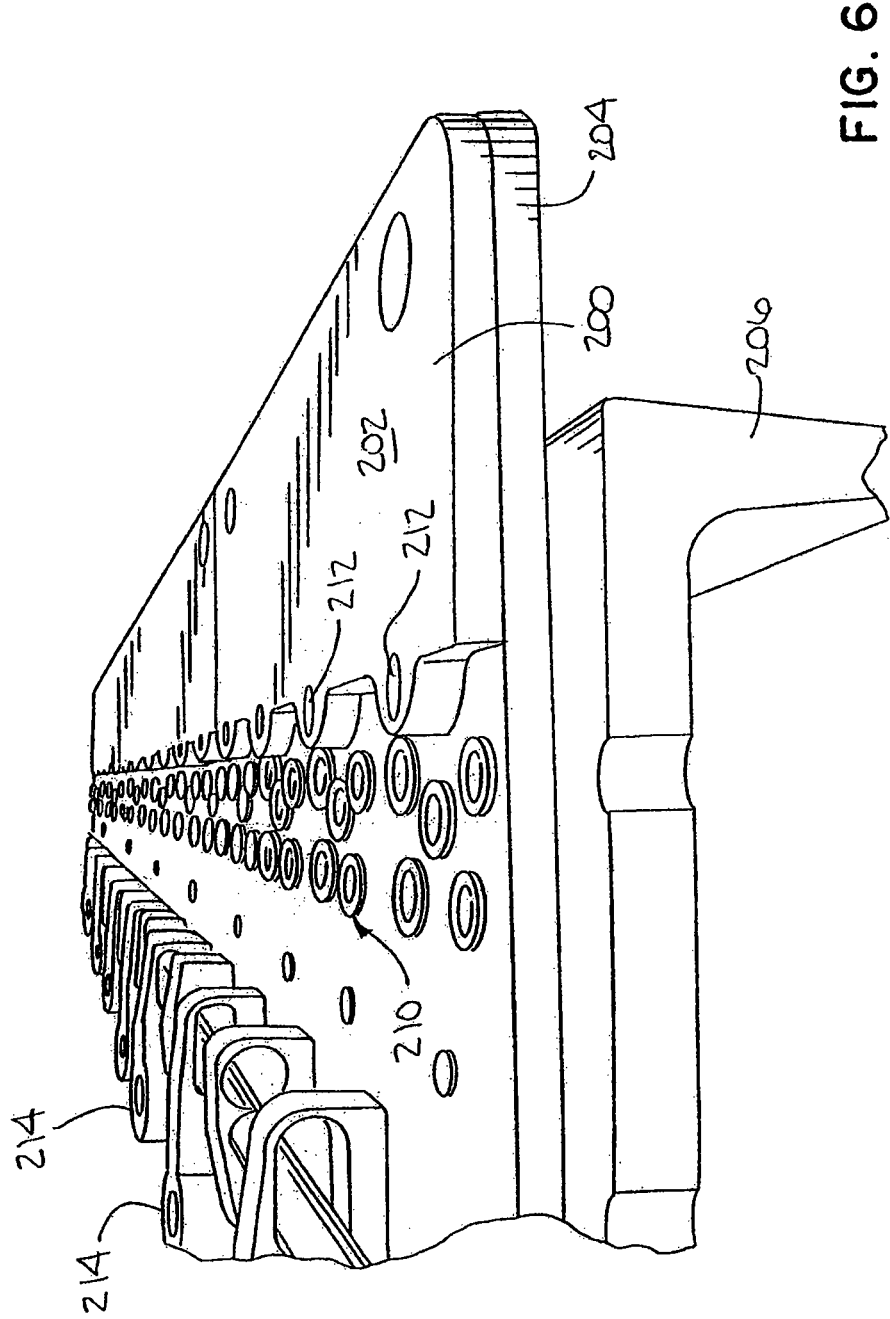
FIG. 6 is a photographic view of an alternative belt fastener applicator system showing a separate riser plate fastened to an underlying anvil plate which is, in turn, secured to a base.

To provide additional locating surfaces for these lower plates 34 having the scalloped, inboard edge 34a, scalloped locating surfaces may be provided on the anvil base 10 to mate with the fastener scalloped edges when the lower plates are nested on the bushings 24 on the anvil plates 14a. To this end, a vertical end wall 82d on the raised plate 82 on the anvil base 10 is provided with a mating scallop surface for each of the scalloped, inboard edges of the strip of belt fasteners being riveted to the belt. More specifically, the scalloped fasteners may have their scalloped edges mated to the scalloped wall 82d of the fixed plate 82 to minimize or prevent the lateral shifting of the inboard edges 34a relative to the hinged portions 36 being held by the gauge pin 50 at the opposite end of the fasteners. As best seen in FIG. 3, the scalloped surface on the plate end wall 82d comprises spaced, curved projections 130 to fit into the depression portions of the lower plates and spaced curved depressions 131 to receive the curved projecting portions the lower plates 34 of each of the string of belt fasteners. Thus, the scalloped edge on the tool provides an extra point of support and guidance for the fasteners to avoid a shifting of a lower plate 34 on the tool during the rivet fastening operation and a miss driving of a rivet.

FIGS. 6-11 are directed to a variation of the embodiment shown in FIGS. 2-5. In this instance, a separate riser plate 200 similar to plate 82 is provided. However, as can be seen in FIGS. 6-10, the riser plate 200 is not provided with the serrations or ridges 84, and instead has a smooth, top surface 202 thereof. In this form, the riser plate 200 is adapted to be used with the current, existing belt fastener installation tool commercially provided by applicant's assignee herein. As such, the riser plate 200 is an add-on component that can aid in the installation process in a manner similar to that described for plate 82.

Namely, the riser plate 200 is fastened to the underlining anvil plate 204 which is secured to and supported on the steel channel base 206. As shown, the end wall 208 of the riser plate 200 is disposed adjacent to the rivet forming bushings 210 of the anvil plate 204. The riser plate 200 is provided with a thickness such that the height of its end wall 208 is sufficient such that with the fasteners 22 secured in position on the anvil plate 204 as previously described with respect to the installation tool of FIGS. 2-5, the insertion of the conveyor belt 28 between the fastener plates 32 and 34 can occur without having the end of the conveyor belt abut or catch against the lower plate 34 of the belt fasteners 22. In other words, the thickness of the riser plate 200 is generally greater than that of the lower plates 34 of the belt fasteners 22 such that the upper surface 202 of the riser plate 200 is raised to such an extent that the leading end of the conveyor belt 28 will not need to be lifted over the lower plates 34 of the belt fasteners 22 to be fit between the fastener plates 32 and 34.

In addition, it can be seen that the end wall 208 has generally annular edge projections 212 extending therefrom generally toward the bushings 210 of the anvil plate 204. These scalloped projections 212 serve substantially the same purpose as the scalloped wall 82d of the plate 82. In this regard, the projections 212 fit into the recesses 34c in the inboard edges 34a of the fastener lower plates 34. Accordingly, the fastener plates are now located securely not only at their outboard side at their loops 36 via the gauge pin 50 and the locating blocks 214 through which the gauge pin 50 extends, but also at their inboard side by the projections 212 configured to be snugly received in the lower plate recesses 34c.

The top surface 202 is also smooth across its entire extent. In this manner, the riser plate 200 differs from the plate 82 in lacking any serrations or ridges 84, as previously mentioned. While not having the improved gripping action provided by these gripping features, the plate 200 also avoids having structure that could cause hang up during sliding of the belt along the belt surface 202 during belt insertion between the fastener plates 32 and 34.

Figure 7:
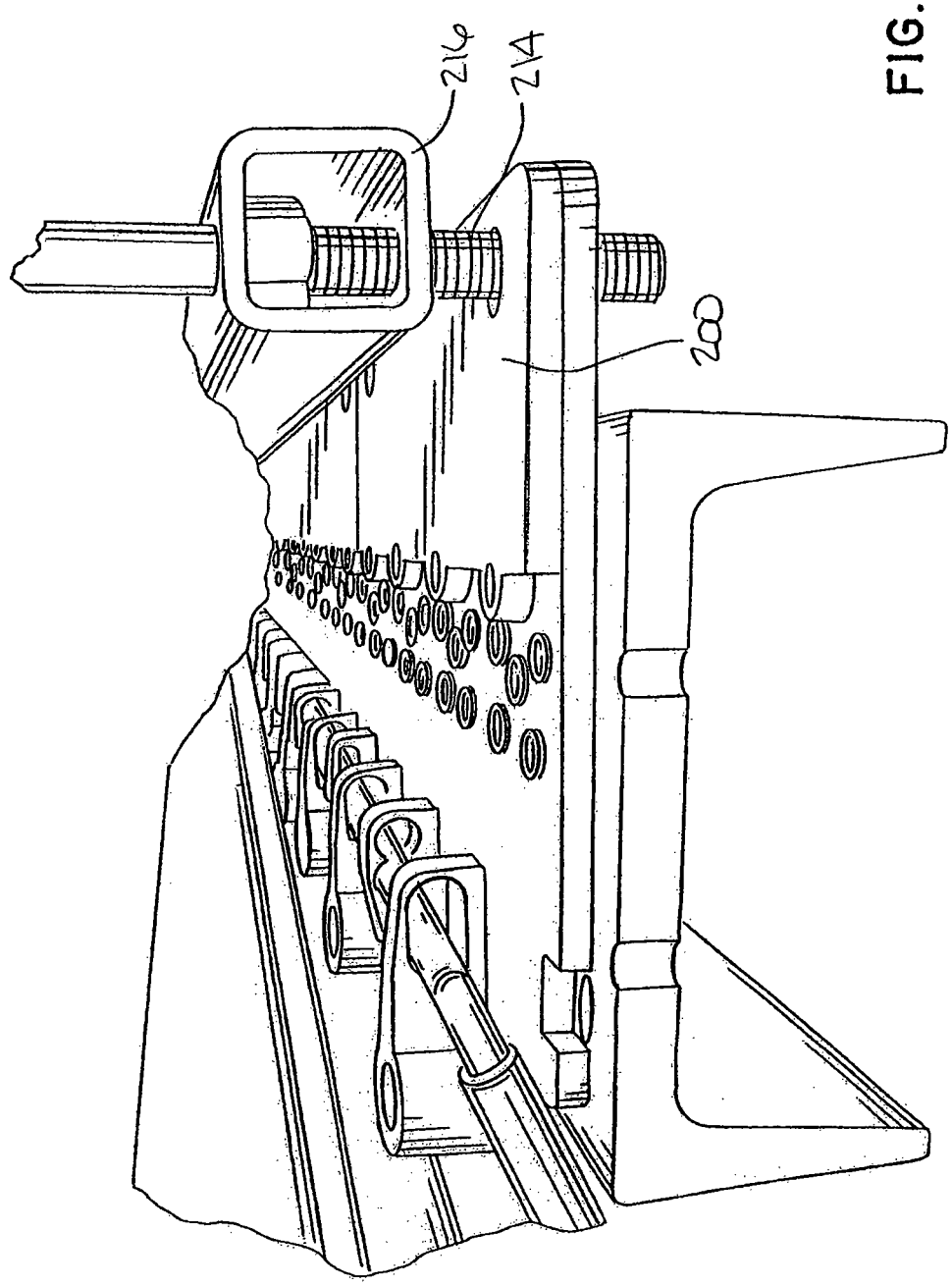
FIG. 7 is a view similar to FIG. 6 showing an existing belt applicator tool including the separate riser plates fastened thereto.

FIG. 7 shows the riser plates 200 secured to the anvil plate in a conventional belt fastener installation tool including a J-screw clamp actuator 214 with a hollow, clamp bar 216 having a square shape in cross-section, as previously described.

Figure 8:
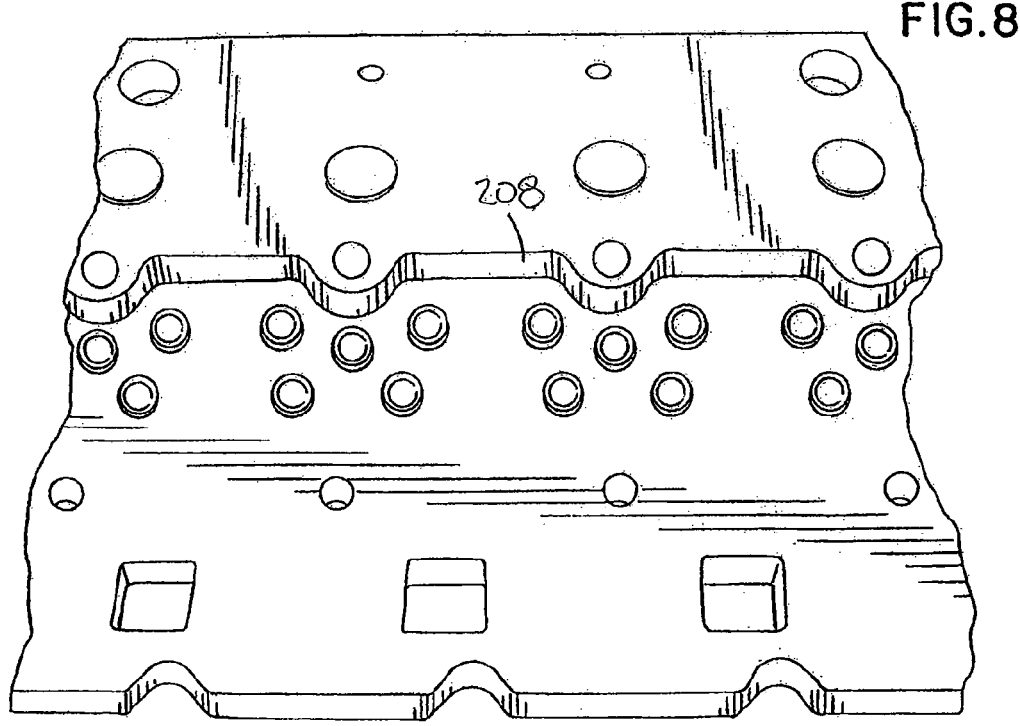
FIG. 8 is a photographic view of the riser plate fastened to the existing anvil plate.
Figure 9:
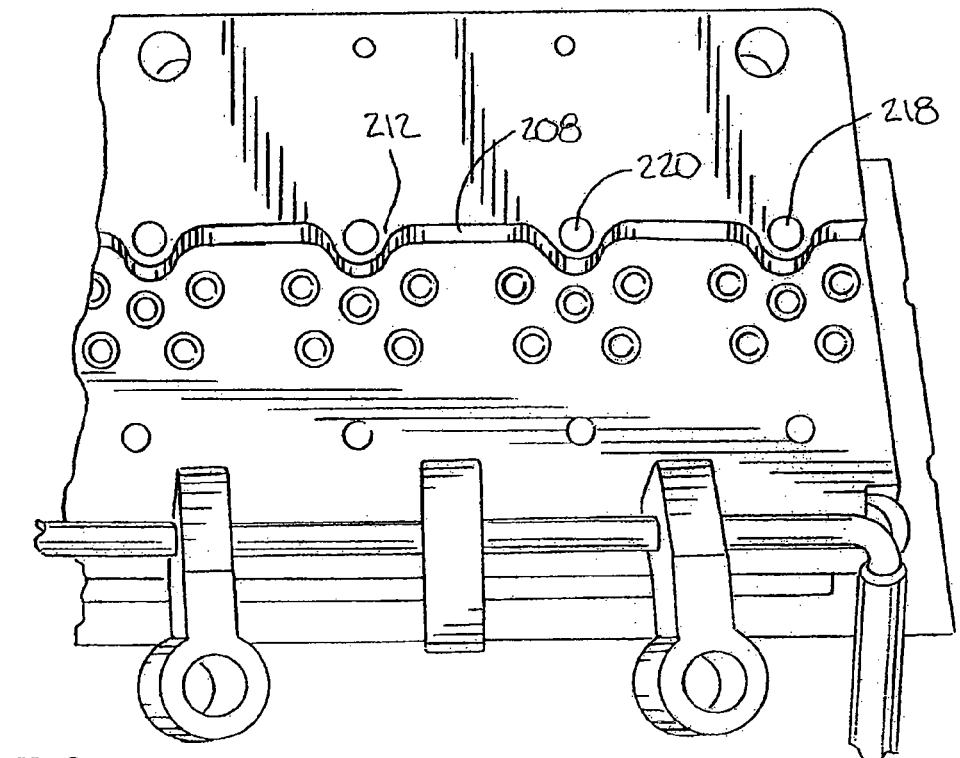
FIG. 9 is a photographic view of the riser plate fastened to the anvil plate via rivets in apertures of edge projections of the riser plate.
Figures 10, 11:
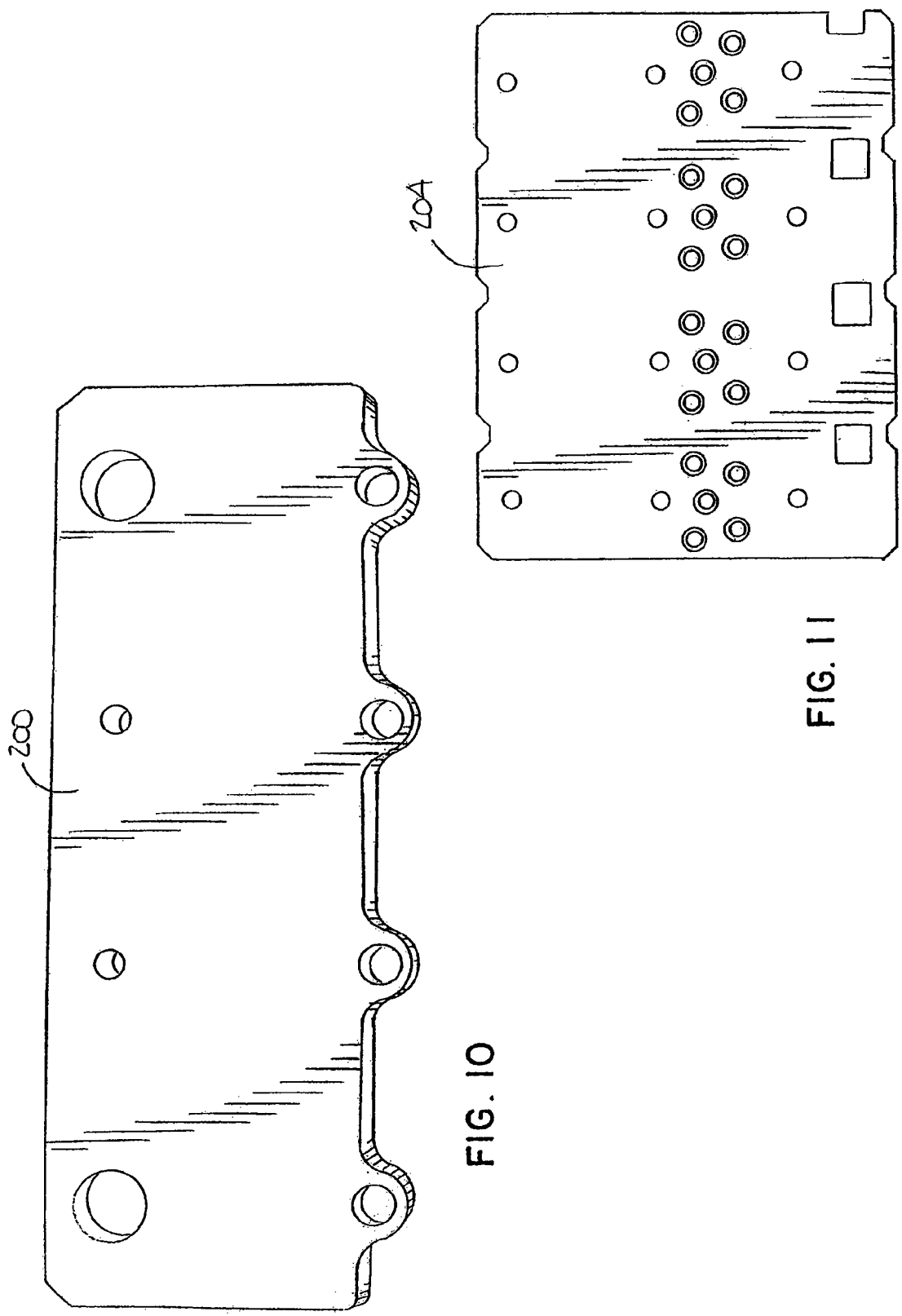
FIG. 10 is a photographic view of the separate riser plate.
FIG. 11 is a photographic view of the existing anvil plate.

FIG. 10 shows the separate riser plate 200 that is configured as an add-on for the existing tool, and particularly, to be fastened to the anvil plate 204 of FIG. 11 that is used with the existing tool. FIG. 8 shows one means of fastening the riser plate 200 to the existing anvil plate 204. Similarly, FIG. 9 shows an alternative means for securing the riser plate 200 to the existing anvil plate 204 via rivets 218 extending through the apertures 220 of the annular projections 212 of the riser plate 200.

Figure 12:
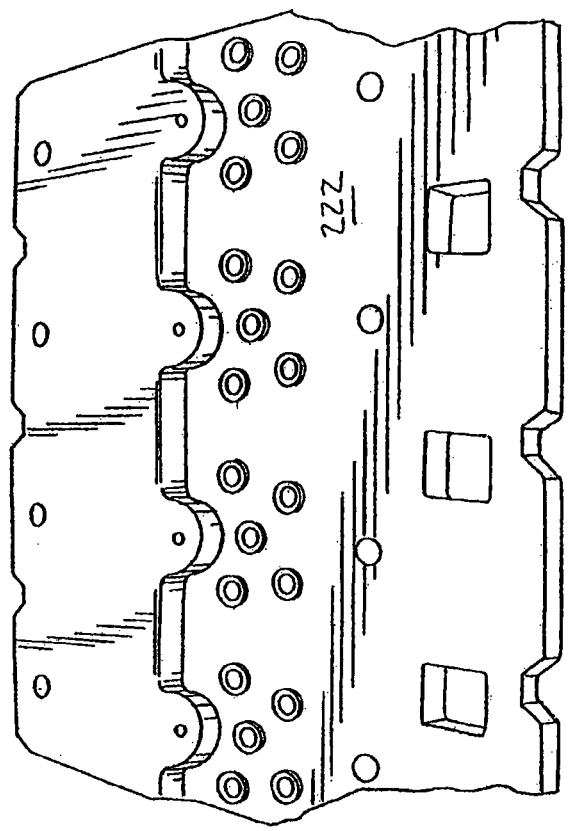
FIG. 12 is a photographic view of a single piece anvil and riser plate member.
Figure 13:
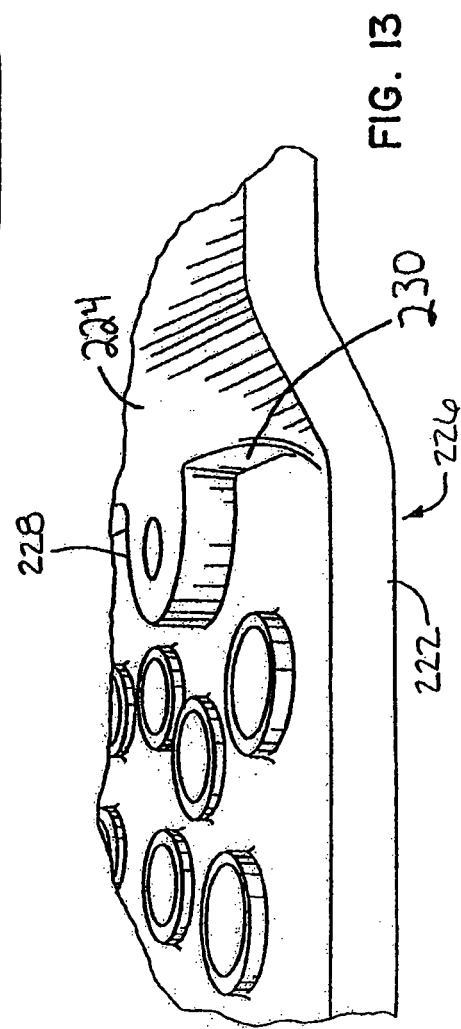
FIG. 13 is a photographic view of the anvil and riser plate member of FIG. 12 showing the offset of the riser plate portion to the anvil plate portion and the locator edge projections extending from the riser plate portion over the anvil plate portion.

FIGS. 12-16 are directed to an alternative where the previously described anvil plates 14, 14a and 204 are formed integrally as a unitary component with the riser plates 82 and 200, respectively. In FIGS. 12 and 13, it can be seen that there is an anvil plate portion 222 that is offset from the raised riser plate portion 224 in the unitary anvil and riser plate member 226. This component is advantageous in that it avoids the need to machine the scalloped projections 228. In this form, the plate member 226 is preferably of a steel material that is formed on a punch press without the need for subsequent machining of the locating projections 228 thereof. As can be seen best in FIG. 13, these projections 228 extend from shoulder or transitional wall 230 of the plate member 226 outwardly from riser plate portion 224 toward and above the offset, recessed anvil plate portion 222 with the projections 228 extending down to the top surface of the anvil plate portion 222.

Figure 14:
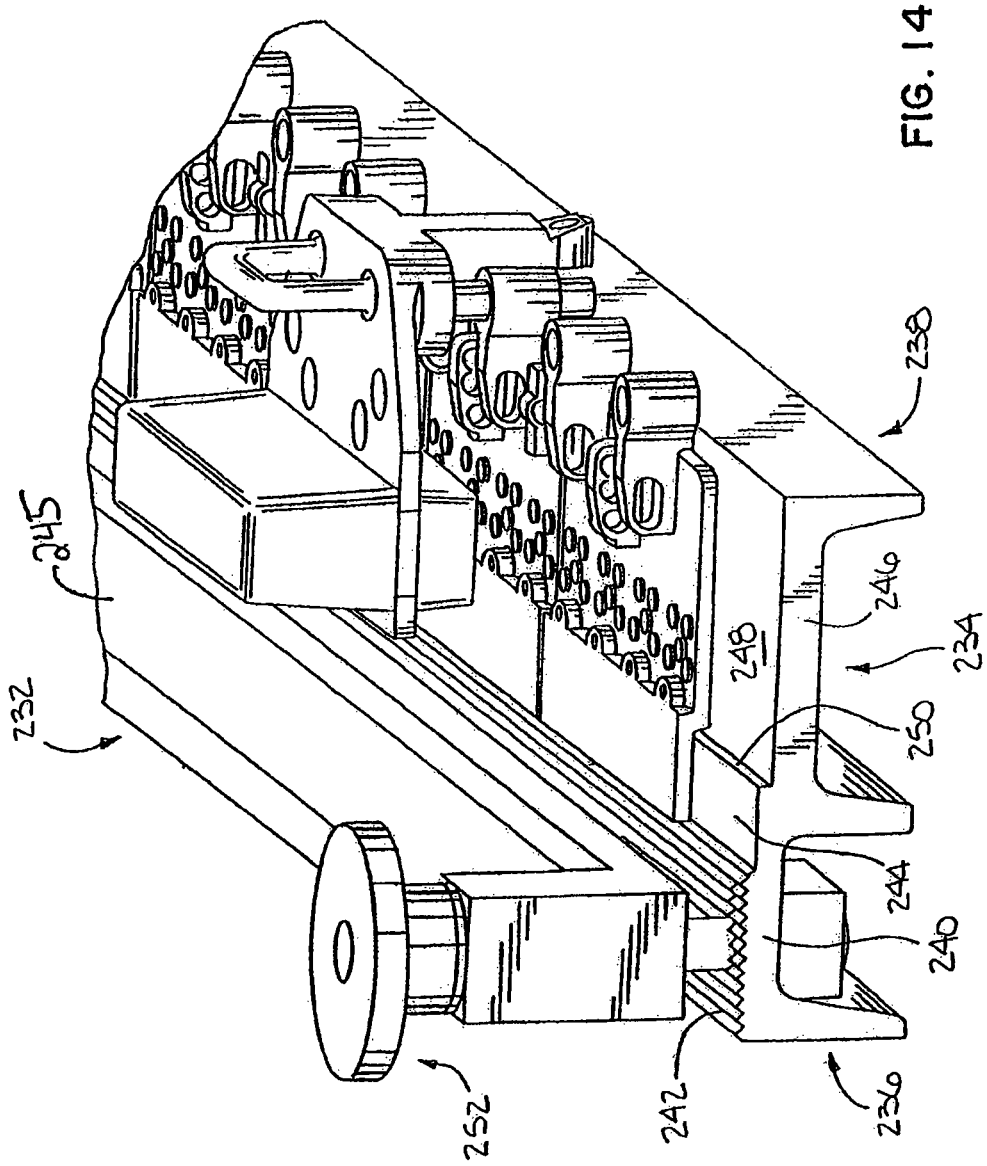
FIG. 14 is a perspective view of the unitary or single piece anvil and riser plate member secured to an extruded base and showing gripping ridges formed on the extruded base under the clamp bar.
Figure 15:
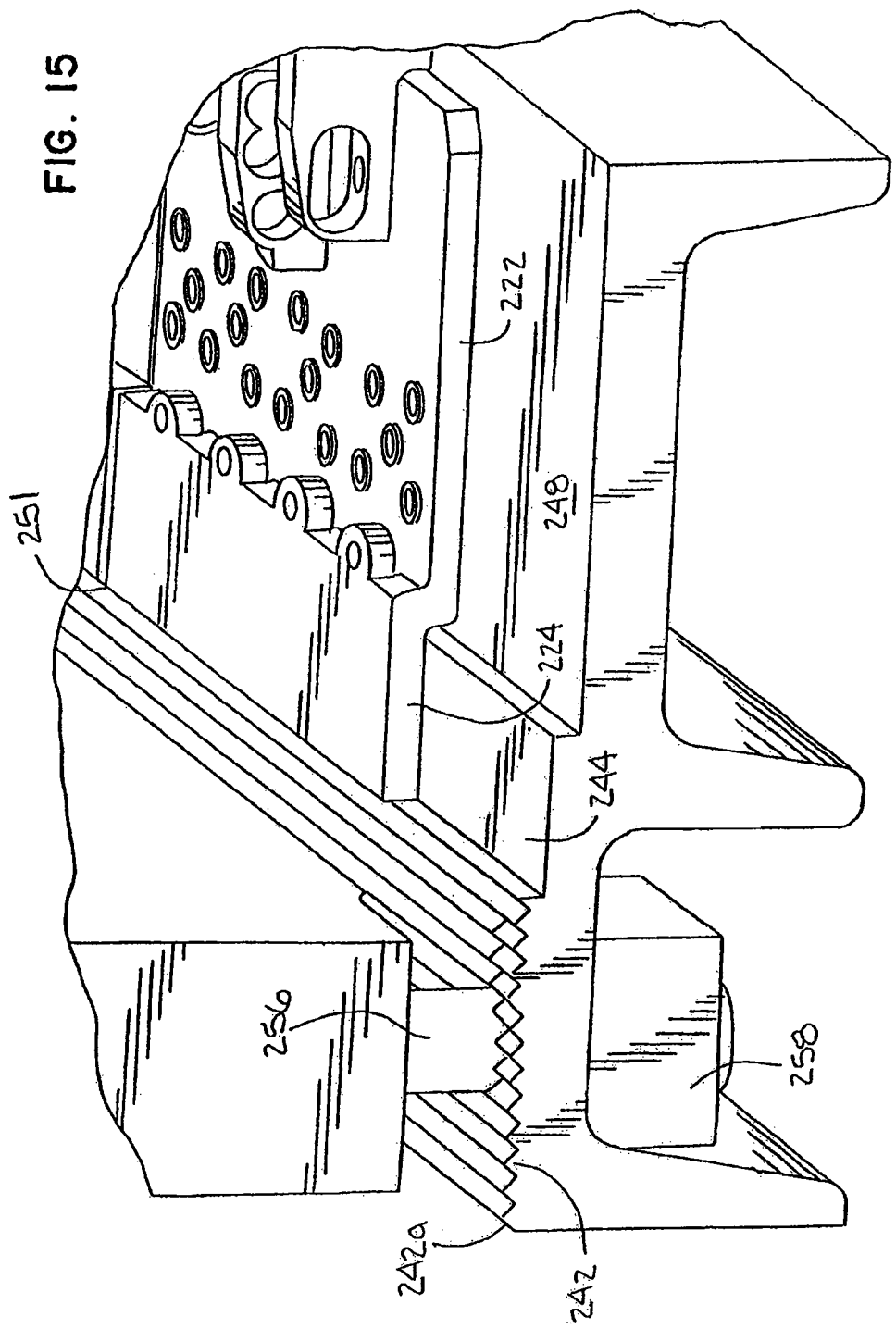
FIG. 15 is an enlarged perspective view similar to FIG. 14 showing a step on the extruded base for supporting the riser plate portion of the single piece anvil and riser plate member adjacent to the gripping ridges of the extruded base.
Figure 16:
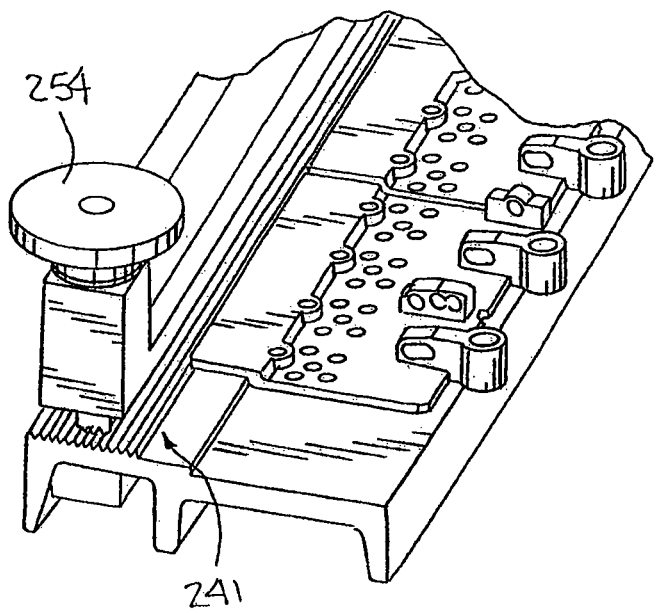
FIG. 16 is a perspective view of the belt applicator system of FIGS. 14 and 15 showing a plurality of single piece anvil and riser plate members secured to the extruded base.

The plate member 226 is adapted to for use on a belt fastener installation tool 232, as shown in FIGS. 14-16. In this tool 232, the base 234 is an extruded component such as of aluminum and has a raised portion 236 and a lowered or recessed portion 238. The raised portion 236 has a web 240 the upper surface 241 of which includes serrations or ridges 242 along the portion thereof under clamp bar 244. The remainder of the web surface 241 is free of such serrations 242. The lowered base portion 238 also has a web wall 246 with its upper surface 248 recessed below the surface portion 244 and serrated surface 242 so that a shoulder or step 250 is formed therebetween. As best seen in FIG. 15, the anvil and riser plate member 226 is secured to the base 234 so that the anvil plate portion 222 extends along the surface 248 and the riser plate portion 224 extends along the surface portion 244. As shown, the top pointed edges 242a of the serrations or ridges 242 are approximately level with the upper, smooth surface 251 of the riser plate portion 224. In this manner, the smooth surface 251 guides the belt as it is inserted between the fastener plates 32 and 34 over the lower plate 34.

The inverted T-shaped clamp bar 245 is operated by a screw clamp 252 that includes an enlarged screw head handle 254 that rotates threaded shaft 256. The shaft extends through a threaded nut block 258 fixed to the bottom of the channel 240 so that turning the screw head 254 in the tightening direction lowers the clamp bar 244 onto the belt 28 to tightly compress it onto the serrations 242 therebelow. As can be seen in FIGS. 12 and 14-16, the plate members 226 are each adapted to seat four fasteners 22 on the anvil plate portion 222 thereof. Depending on the length of the belt 28, several of such plate members 226 are secured to the recessed portion 238 of the extruded aluminum channel base 234, as shown in FIG. 16.

Figure 17:
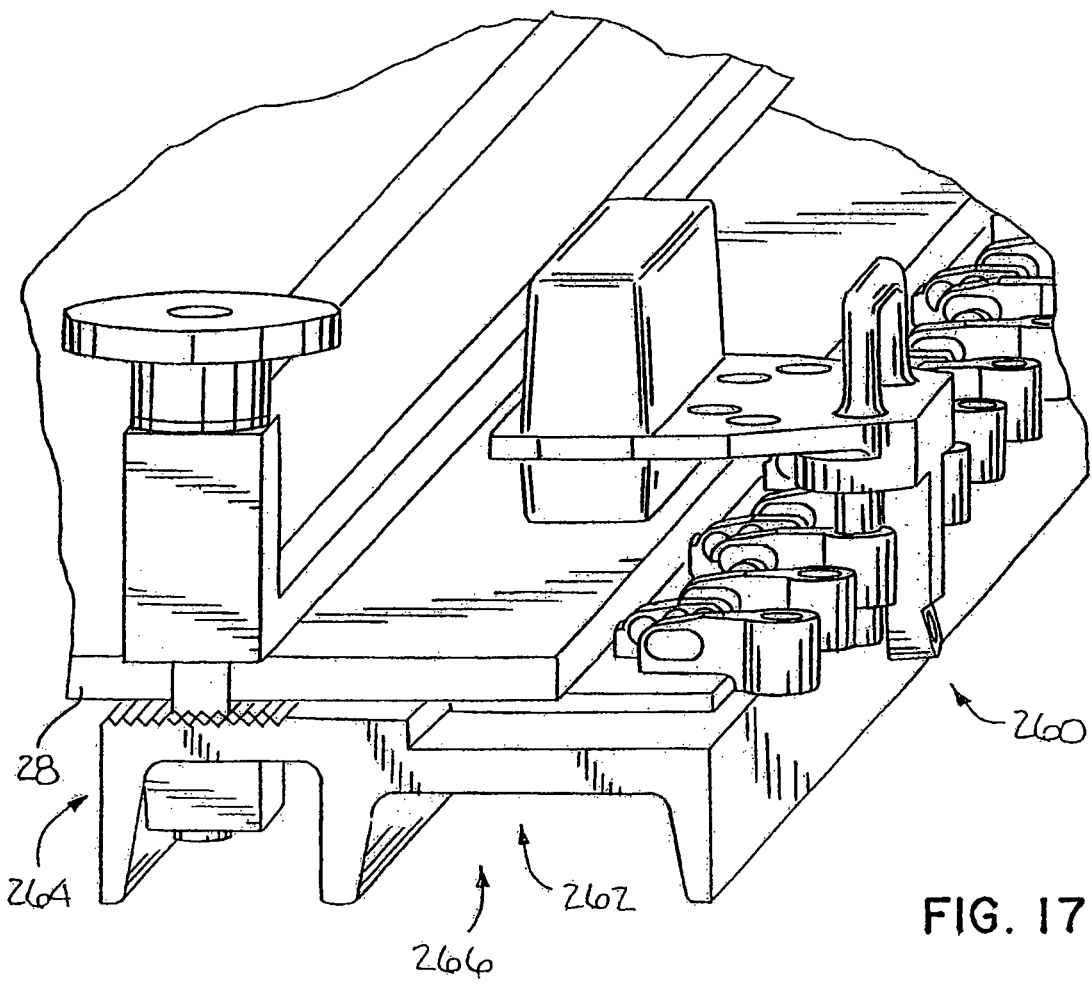
FIG. 17 is a alternative belt applicator system showing an extruded base having the raised surface formed integrally thereon with the raised surface including the gripping ridges under the clamp bar and a smooth surface portion adjacent the separate anvil plates secured to a recessed surface of the extruded base.
Figure 18:
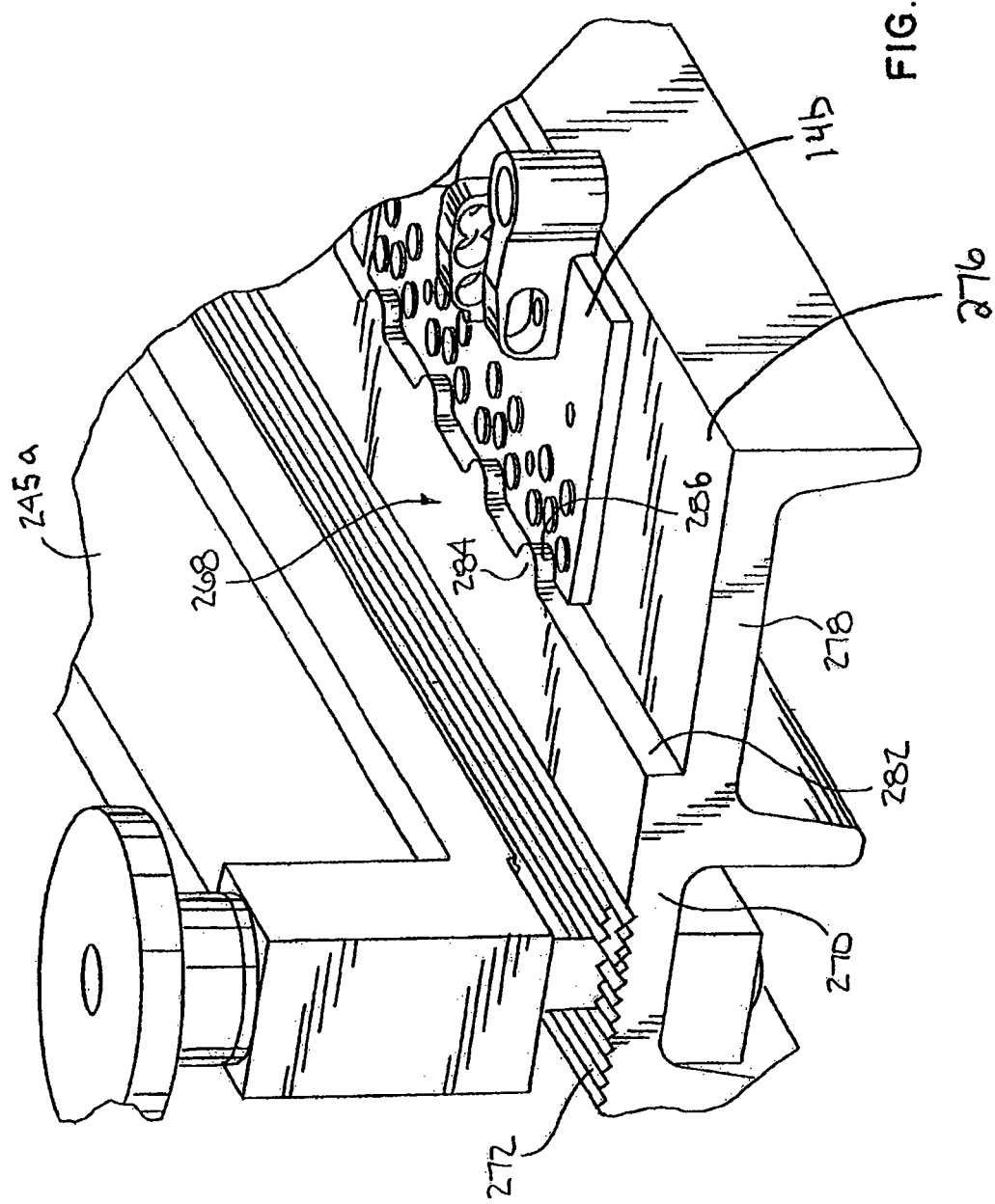
FIG. 18 is a enlarged perspective view similar to FIG. 17 with the conveyor belt removed to show the edge scalloped projections integrally formed on the extruded base to extend from the raised surface over the recessed surface thereof.
Figure 19:
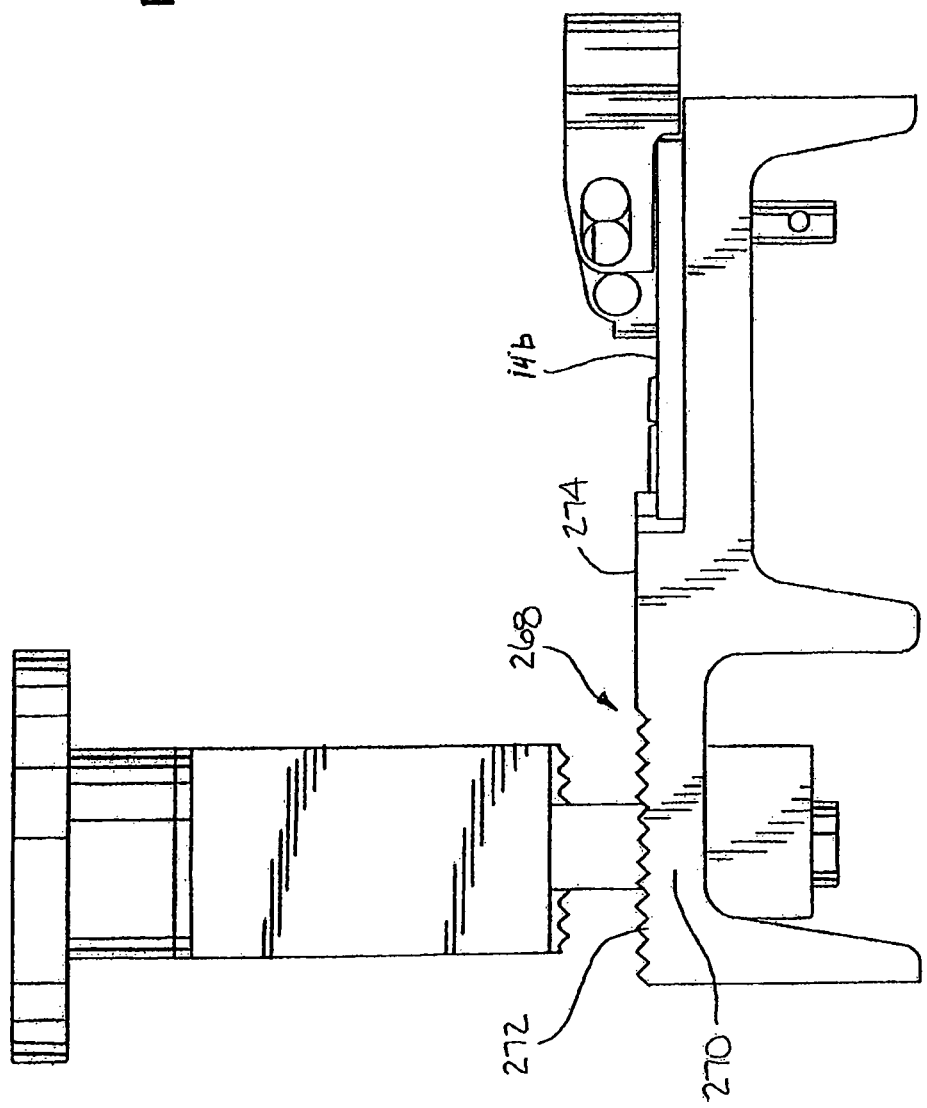
FIG. 19 is an elevational view showing the separate anvil plate secured to the recessed surface adjacent to the smooth surface portion of the raised surface of the extruded base.

FIGS. 17-19 are directed to another alternative of a belt fastener installation tool 260. In belt fastener installation tool 260, the base 262 is also an extruded component, preferably of aluminum similar to base 234 in that it includes a raised portion 264 and a lowered portion 266. However, in this extruded base 262, the entire raised belt guiding surface 268 is formed integrally on the web wall 270 of the base raised portion 264. Accordingly, a separate component that includes a raised surface portion such as the previously described riser plate portion 245a is avoided. The raised surface 268 includes a serrated surface portion 272 under the clamp bar 244 and a smooth surface portion 274 that extends toward the recessed surface 276 from the serrated surface portion 272, as can be seen in FIGS. 18 and 19. As previously discussed, the smooth surface portion 274 allows the belt to ride thereover with a minimum of hang ups for smooth sliding of the belt 28 in between the belt fastener plates 32 and 34. As shown, the recessed surface 276 is formed on the top surface of the webwall 278 of the lowered base portion 266. In the tool 260, the anvil plates 14b are separate components that are secured to the webwall 278 supported on surface 276 thereof.

The base 262 has a shoulder surface 282 extending vertically between the raised surface 268 and the recessed surface 276. The shoulder surface 282 is scalloped to include edge projections 284 extending therefrom. The extrusion of the base 262 requires that these projections 284 be separately machined into the surface 282 and thus is less desirable from a manufacturing cost standpoint than the previously-described versions including scalloped projections formed on separate components, i.e. the risen plates 82 and 200, and the anvil and riser plate member 226. As shown in FIG. 18, the anvil plates 14b have corresponding recesses 286 for being located by the projections 284 in a manner similar to the lower plates of the belt fasteners 22, as has been previously described.

The invention claimed is:

1. An installation tool for applying belt fasteners having upper and lower plates to conveyor belts, the installation tool comprising:
   a base;
   an elongate unitary, one-piece plate of metallic material for being attached to the base, the unitary, one-piece plate having opposite sides extending longitudinally thereal-ong, upper and lower surfaces extending between the opposite sides;
   a recessed, lower anvil portion of the unitary plate configured for supporting the belt fasteners thereon with the lower plates engaged therewith, the recessed, lower anvil portion having an upper surface portion of plate upper surface and a lower surface portion of the plate lower surface;
   a riser belt guiding portion of the unitary plate adjacent to and offset from the recessed, lower anvil portion for supporting a leading end portion of the belt to be advanced therealong and over the lower plate of the fastener on the recessed, lower anvil portion, the riser belt guiding portion having an upper surface portion of the plate upper surface and a lower surface portion of the plate lower surface;
   a transition portion of the unitary plate that jogs between the recessed, lower anvil portion and the riser belt guiding portion so that the respective upper surface portions thereof are offset from each other and the respective lower surface portions thereof are offset from each other;
   locating projections of the unitary plate that are punched therein between the riser belt guiding portion and the recessed, lower anvil portion for locating the lower plate on the recessed, lower anvil portion.

2. The installation tool of claim 1 wherein the transition portion of the unitary plate includes a should wall, and the locating projections extend out from the shoulder wall toward and above the recessed anvil portion and down to the upper surface portion thereof.

3. The installation tool of claim 1 wherein the base includes a raised portion configured to support the riser belt guiding portion of the plate and a recessed portion of the base configured to support the recessed anvil portion of the plate.

4. The installation tool of claim 1 wherein the base includes a raised portion having a raised clamping surface thereof that is closely adjacent to the riser belt guiding portion of the plate attached to the base and which cooperates therewith to support and guide the leading end portion of the belt thereon to be advanced between the fastener plates.

5. The installation tool of claim 1 wherein the base includes a lower horizontal web portion configured to support the unitary plate mounted thereon, an upper, raised horizontal web portion vertically offset from the lower horizontal web portion to support the belt leading end portion to be clamped thereto, end leg portions depending from the upper and lower horizontal web portions, and an intermediate leg portion spaced between the end leg portions with the leg portions cooperating to engage a support surface to support the horizontal web portions thereabove.

6. The installation tool of claim 5 wherein the raised horizontal web portion includes gripping structure along a portion thereof; and
   a clamp for clamping the belt tightly against the gripping structure with the leading end portion received between the fastener plates.

7. An installation tool for applying belt fasteners having upper and lower plates to conveyor belts, the installation tool comprising:
   a plate;
   a recessed anvil portion of the plate configured for supporting the belt fasteners thereon with the lower plates engaged therewith;
   a riser belt guiding portion of the plate adjacent to and offset from the recessed anvil portion of the plate to be raised relative thereto;
   a base for supporting the plate thereon and having raised and recessed surface portions thereof for supporting the corresponding riser belt guiding portion and recessed anvil portion of the plate thereon with the plate riser belt guiding portion extending along and on the base raised surface portion and the plate recessed anvil portion extending along and on the base recessed surface portion; and
   an upper clamping surface of the base raised portion that is approximately level with the plate riser belt guiding portion with the plate supported on the base for supporting a leading end portion of the belt to be advanced along the clamping surface of the base and the plate riser belt guiding portion.

8. The installation tool of claim 7 wherein the base upper clamping surface includes gripping structure configured for secure clamping of the belt thereagainst.

9. The installation tool of claim 7 wherein the plate riser belt guiding portion includes a smooth upper surface portion for allowing the belt to be smoothly advanced thereon.

\* \* \* \* \*